G. A. SWARTZ.
SHAFT COUPLING.
APPLICATION FILED JULY 15, 1914.

1,225,524.

Patented May 8, 1917.

Witnesses

Inventor
G. A. Swartz
By
Attorney

UNITED STATES PATENT OFFICE.

GEORGE A. SWARTZ, OF PEARL RIVER, NEW YORK.

SHAFT-COUPLING.

1,225,524.

Specification of Letters Patent.

Patented May 8, 1917.

Application filed July 15, 1914. Serial No. 851,156.

*To all whom it may concern:*

Be it known that I, GEORGE A. SWARTZ, a citizen of the United States, residing at Pearl River, in the county of Rockland, State of New York, have invented certain new and useful Improvements in Shaft-Couplings; and I do hereby declare the following to be a full, clear, and exact description of the invention, such as will enable others skilled in the art to which it appertains to make and use the same.

This invention relates to improvements in shaft couplers and universal joints which are employed for connecting two shafts or other rotatable power transmitting members which are arranged either substantially in alinement or at an angle to each other.

The object of the present invention is to simplify the construction of shaft couplers of this character, whereby a structure is provided wherein there is a continuous central working of the various operating parts.

An additional object is the provision of a device of this character which will be simple and inexpensive in manufacture, efficient and durable in use, effective in operation, and a general improvement of the art.

With these and other objects and advantages in view, the invention consists in the construction and arrangement of parts as will be hereinafter more fully described and claimed, and illustrated in the accompanying drawing, in which—

Figure 1:
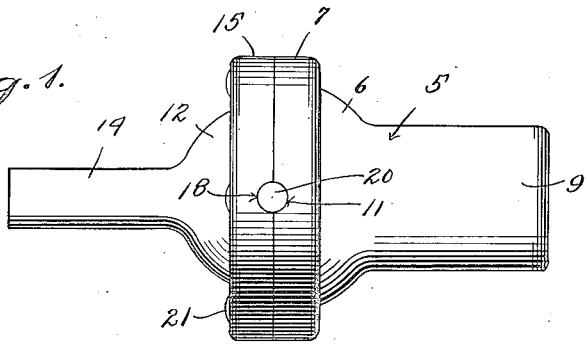
Figure 1 is a top plan view of my device.
Figure 2:
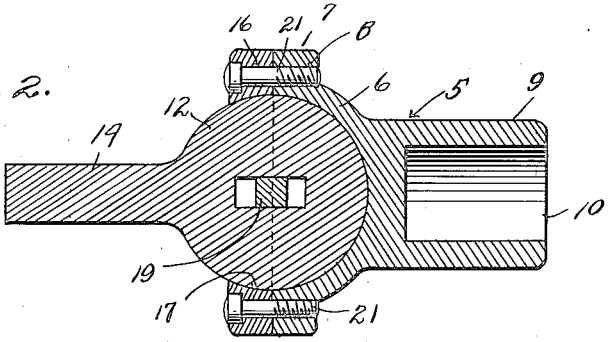
Fig. 2 is a longitudinal sectional view.
Figure 3:
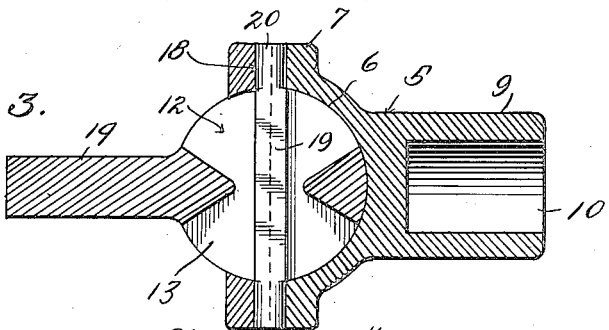
Fig. 3 is a similar view taken at right angles to Fig. 2.
Figure 4:
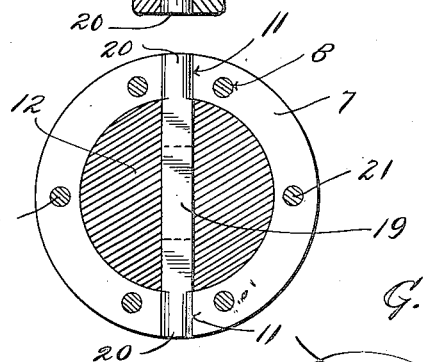
Fig. 4 is a central cross sectional view.

Referring more particularly to the drawing, the numeral 5 designates the socket portion of my device which comprises a substantially semi-spherical shell 6 having an annular flange 7 formed thereon and provided with a plurality of holes 8. The shell 6 terminates in a sleeve 9 provided with a socket 10 adapted to receive one end of a shaft. The outer face of the flange 7 is provided with diametrically arranged semi-circular recesses 11, for a purpose to be described.

The movable member comprises a ball 12 provided with a slot 13 in alinement with the recesses 11, and terminating in a spindle 14 adapted to be connected with a socket on one end of the other shaft, not shown. The ball 12 is disposed within the semi-spherical shell 6.

In order to clamp the ball within the shell 6, I provide a ring 15 provided adjacent its periphery with holes 16 registering with the holes 8. The internal periphery of the ring 15 is curved as shown at 17 to conform to the curvature of the ball 12. The ring 15 is provided upon its inner face with recesses 18, diametrically arranged and alining with the recesses 11.

In order that rotary movement of either the socket member 5 or the ball 12 may be imparted to the other member, I provide a pin 19, square in cross section and extending through the slot 13 in the ball. The ends of the pin 19 are formed circular to provide trunnions 20 disposed within the registering semi-circular recesses 11 and 18 in the flange 7 and ring 15, respectively.

The device is assembled as follows: The pin 19 is inserted within the slot 13, and the ball 12 is then disposed within the semi-spherical shell 6, with the trunnions 20 disposed in the recesses 11. The ring 15 is then slipped over the spindle 14 and onto the ball 12, with the recesses 18 engaging the trunnions 20. Bolts 21 are then inserted through the alined holes 8 and 16, for clamping the device firmly together.

It will therefore be obvious that if either the socket or ball member is rotated, the other will be rotated by virtue of the pin 19. In case the driving and driven shafts are not in alinement, this is compensated for by virtue of the fact that the ball 12 can move within the shell 6 and that movement at right angles to such movement is allowed for on account of the slot 13 allowing the ball 12 to move relatively to the pin 19.

On account of the peculiar construction of my device, it will be seen that it is merely necessary to remove one set of bolts in order to separate the parts of the device entirely. It will also be noted that the construction is extremely simple and therefore leads to economy in construction and renders the device not liable to get out of order.

It will be readily understood that I reserve the right to make various changes in the form, construction and arrangement of parts without departing from the spirit of the invention or limiting the scope of the subjoined claim.

Having thus described my invention, I claim:

A shaft-coupling, comprising in combination, a semi-spherical shell having an outturned flange formed around its edge, said flange having diametrically opposite bearing notches formed therein, a narrow complementary retaining ring faced against said flange and having companion notches registering with the notches in said flange, a spindle rotatably mounted in said bearing notches and having a squared shank, and a solid spherical head mounted in said shell and retained by said ring, said head having a diametrical slot through which said spindle extends and the latter riding against the opposing faces of the slot.

In testimony whereof, I affix my signature, in the presence of two witnesses.

GEORGE A. SWARTZ.

Witnesses:
 JAMES B. MOORE,
 WOOLSEY A. SERVEN.